United States Patent
Holmes et al.

(10) Patent No.: US 12,379,138 B2
(45) Date of Patent: Aug. 5, 2025

(54) MITIGATING FLUID LOSS OR INFLOW IN A CLOSED-LOOP GEOTHERMAL SYSTEM

(71) Applicant: Eavor Technologies Inc., Calgary (CA)

(72) Inventors: Michael Holmes, Calgary (CA); Matthew Toews, Calgary (CA)

(73) Assignee: Eavor Technologies Inc., Calgary (CA)

( * ) Notice: Subject to any disclaimer, the term of this patent is extended or adjusted under 35 U.S.C. 154(b) by 0 days.

(21) Appl. No.: 18/711,333

(22) PCT Filed: Nov. 17, 2021

(86) PCT No.: PCT/IB2021/060674
§ 371 (c)(1),
(2) Date: May 17, 2024

(87) PCT Pub. No.: WO2023/089357
PCT Pub. Date: May 25, 2023

(65) Prior Publication Data
US 2025/0027686 A1    Jan. 23, 2025

(51) Int. Cl.
| F24T 10/15 | (2018.01) |
| F03G 4/00 | (2006.01) |
| F24T 10/00 | (2018.01) |
| F24T 50/00 | (2018.01) |

(52) U.S. Cl.
CPC ............ *F24T 10/15* (2018.05); *F03G 4/029* (2021.08); *F03G 4/033* (2021.08); *F03G 4/035* (2021.08); *F03G 4/072* (2021.08); *F24T 50/00* (2018.05); *F24T 2010/56* (2018.05)

(58) Field of Classification Search
CPC ....... F24T 10/15; F24T 50/00; F24T 2010/56; F03G 4/029; F03G 4/033; F03G 4/035; F03G 4/072

USPC .............................................. 60/641.2–641.4
See application file for complete search history.

(56) References Cited

U.S. PATENT DOCUMENTS

| 6,668,554 B1 | 12/2003 | Brown |
| 7,373,785 B2 | 5/2008 | Kidwell et al. |
| 10,794,160 B2* | 10/2020 | Takahashi ............... E21B 43/00 |
| 2007/0023164 A1* | 2/2007 | Kidwell .................. F28F 13/12 |
| | | 165/45 |

(Continued)

FOREIGN PATENT DOCUMENTS

| CA | 3044153 C * | 9/2020 | ............. C04B 28/26 |
| CA | 3097436 A1 | 10/2020 | |
| WO | WO 2022/029699 A1 | 2/2022 | |

OTHER PUBLICATIONS

Extended European Search Report in European Appln. No. 21964660.1, mailed on Nov. 15, 2024, 12 pages.

(Continued)

*Primary Examiner* — Hoang M Nguyen
(74) *Attorney, Agent, or Firm* — Fish & Richardson P.C.

(57) ABSTRACT

A method includes circulating a heat transfer working fluid in a closed loop between a geothermal well residing in a subterranean zone and at least one of a heat exchanger or a turbine. The well is substantially sealed to limit fluid loss of the working fluid into the subterranean zone. While circulating the working fluid, at least one of a viscosity of the working fluid or a pressure differential between the working fluid and the subterranean zone is controlled in relation to a flow of fluid between the subterranean zone and the well.

24 Claims, 4 Drawing Sheets

(56) References Cited

U.S. PATENT DOCUMENTS

| | | | |
|---|---|---|---|
| 2013/0153399 A1* | 6/2013 | McAlister | C01B 32/205 203/25 |
| 2013/0227947 A1* | 9/2013 | Bronicki | F01K 25/08 60/671 |
| 2013/0333383 A1* | 12/2013 | Schwarck | F24T 10/10 165/45 |
| 2015/0168022 A1* | 6/2015 | Takata | F01K 9/003 60/671 |
| 2018/0283735 A1 | 10/2018 | Song et al. | |
| 2019/0346181 A1 | 11/2019 | Toews et al. | |
| 2020/0011151 A1* | 1/2020 | Toews | E21B 43/305 |
| 2021/0003320 A1 | 1/2021 | Toews et al. | |
| 2021/0325089 A1 | 10/2021 | Toews et al. | |
| 2023/0288099 A1* | 9/2023 | Toews | H02J 15/00 |

OTHER PUBLICATIONS

Glossary.slb.com [online], "Leak off," available on or before Jun. 16, 2021, retrieved on Feb. 14, 2025, retrieved from URL <https://glossary.oilfield.slb.com/en/terms/l/leak off>, 2 pages.

International Preliminary Report on Patentability for International Appln. PCT/IB2021/060674, mailed on May 30, 2024, 7 pages.

International Search Report and Written Opinion for International Appln. PCT/IB2021/060674, mailed on Aug. 17, 2022, 11 pages.

Wikipedia.com [online], "Lost circulation," available on or before Oct. 16, 2024, retrieved on Feb. 14, 2025, retrieved from URL <https://en.wikipedia.org/wiki/Lost_circulation>, 3 pages.

* cited by examiner

MITIGATING FLUID LOSS OR INFLOW IN A CLOSED-LOOP GEOTHERMAL SYSTEM

TECHNICAL FIELD

This disclosure relates to closed-loop geothermal systems.

BACKGROUND

Closed-loop geothermal systems include a working fluid circulated within wellbores drilled into a subterranean zone. The working fluid absorbs heat from the subterranean zone, which can be harvested to produce electricity or for other applications. They system is closed-loop in that the system is constructed to limit, and ideally prevent, exchange of fluids with the surrounding formation(s) of the subterranean zone.

SUMMARY

This disclosure relates to closed-loop geothermal systems.

Certain aspects of the subject matter herein can be implemented as a method. The method includes circulating a heat transfer working fluid in a closed loop between a geothermal well residing in a subterranean zone and at least one of a heat exchanger or a turbine. The well is substantially sealed to limit fluid loss of the working fluid into the subterranean zone. While circulating the working fluid, at least one of a viscosity of the working fluid or a pressure differential between the working fluid and the subterranean zone is controlled in relation to a flow of fluid between the subterranean zone and the well.

An aspect combinable with any of the other aspects can include the following features. The well can include a surface wellbore extending from the Earth's surface to the subterranean zone and a lateral wellbore extending from the surface wellbore in the subterranean zone. Circulating the working fluid can include circulating the working fluid in a closed loop between the heat exchanger, the surface wellbore and the lateral wellbore.

An aspect combinable with any of the other aspects can include the following features. At least a portion of the lateral wellbore can be sealed with a sealant embedded in the subterranean zone.

An aspect combinable with any of the other aspects can include the following features. The surface wellbore can be substantially vertical.

An aspect combinable with any of the other aspects can include the following features. At least a portion of a length of the surface wellbore can be cased, and a majority of a length of the lateral wellbore can be open hole.

An aspect combinable with any of the other aspects can include the following features. At least a portion of a length of the lateral wellbore can be cased.

An aspect combinable with any of the other aspects can include the following features. The working fluid can be shear thinning.

An aspect combinable with any of the other aspects can include the following features. Circulating the working fluid can include circulating the working fluid under a higher average shear rate in the surface wellbore than in the lateral wellbore.

An aspect combinable with any of the other aspects can include the following features. A Reynolds number of fluid flow in the lateral wellbore can be above 3,000.

An aspect combinable with any of the other aspects can include the following features. The pressure differential between the working fluid and the subterranean zone can be controlled toward a target pressure differential by emulsifying a gas within the working fluid.

An aspect combinable with any of the other aspects can include the following features. The pressure differential between the working fluid and the subterranean zone can be controlled toward a target pressure differential by adding low density particles to the working fluid.

An aspect combinable with any of the other aspects can include the following features. The pressure differential between the working fluid and the subterranean zone can be controlled toward a target pressure differential by adding a material to the working fluid having a higher density than the working fluid.

An aspect combinable with any of the other aspects can include the following features. The pressure differential between the working fluid and the subterranean zone can be controlled toward a target pressure differential by flowing, with the working fluid, a second fluid having a different density than the working fluid.

An aspect combinable with any of the other aspects can include the following features. The pressure differential between the working fluid and the subterranean zone can be controlled toward a target pressure differential by controlling a temperature of the working fluid.

An aspect combinable with any of the other aspects can include the following features. The pressure differential between the working fluid and the subterranean zone can be controlled toward a target pressure differential by controlling a pressure at which the working fluid is circulated.

The pressure differential between the working fluid and the subterranean zone can be controlled toward a target pressure differential using a fluid flow restriction having specified flow characteristics in the well.

An aspect combinable with any of the other aspects can include the following features. The pressure differential between the working fluid and the subterranean zone can be controlled toward a target pressure differential by adjusting a fluid level of the working fluid within the well in relation to a vapor space above the fluid level within in the well proximate to the surface.

An aspect combinable with any of the other aspects can include the following features. The pressure differential between the working fluid and subterranean zone can be controlled towards a target pressure differential by controlling a circulation rate of the working fluid.

An aspect combinable with any of the other aspects can include the following features. The pressure differential between the working fluid and subterranean zone can be controlled towards a target pressure differential by selecting a specified diameter of the surface wellbore or the lateral wellbore.

Certain aspects of the subject matter herein can be implemented as a method. The method includes selecting a working fluid to exhibit a viscosity to control a loss of the working fluid into a subterranean zone. The loss occurs while the working fluid is circulated in a closed loop between a geothermal well residing in the subterranean zone and at least one of a heat exchanger or a turbine. Heat from the working fluid is extracted with the heat exchanger while the working fluid is circulating in the closed loop.

An aspect combinable with any of the other aspects can include the following features. Selecting the working fluid can include selecting a shear thinning fluid as the working fluid.

DETAILED DESCRIPTION

In closed-loop geothermal systems, a working fluid is circulated within a closed loop including a subsurface well and a surface or (at least partially) subsurface facility that is configured to extract the heat for use. In certain instances, the facility includes a heat exchanger for extracting the heat and conveying it into a related process such as a Rankine cycle (e.g., Organic Rankine Cycle) or other heat cycle that generates electricity, a steam generation process for industrial, agricultural or residential use, or another process. In certain instances, the facility directly uses the heated working fluid, such as by passing it through an expander (e.g., a turbine) that drives a electric generator or directly using the heat of the working fluid in an industrial, agricultural or residential process. In such a closed-loop system, contact between the working fluid and the natural fluids (for example, groundwater) of the subterranean zone is substantially eliminated or minimized by the piping, wellbore casing, wellbore sealants, and other components or features of the system.

According to the concepts herein, in certain instances, the closed-loop systems include one or more inlet wellbores and one or more outlet wellbores connected by one or more lateral wellbores branching from the inlet wellbore(s) and intersecting and/or otherwise fluidly coupled to the outlet wellbore(s) (e.g., by fractures extending between the wellbores). In certain instances, the lateral wellbore(s) are horizontal, sloped acutely or obtusely relative to vertical, or otherwise non-vertical. The inlet wellbore(s) and outlet wellbore(s) can be coupled by a network of multilateral wellbores. In certain instances, the lateral wellbore(s), or some or all of the multilateral wellbores, may be uncased or otherwise open hole but (wholly or substantially) sealed against the flow of fluid into our out of the system by, for example, a sealant embedded in the subterranean zone into which the wellbores are drilled. However, because the seal created by the sealant may not be completely impermeable, and/or because of fractures or other cracks or permeability in the seal made by the sealant, some fluid may leak into or out of the system. Such flow of fluids into or out of the system can result in a lowering of volume and/or diluting of working fluid. Such exchange of fluids can result in a reduction in the efficiency of the geothermal system and/or other undesirable effects. In accordance with some instances of the concepts herein, such flow of fluids into or out of the closed-loop system can be eliminated or reduced.

Figure 1:
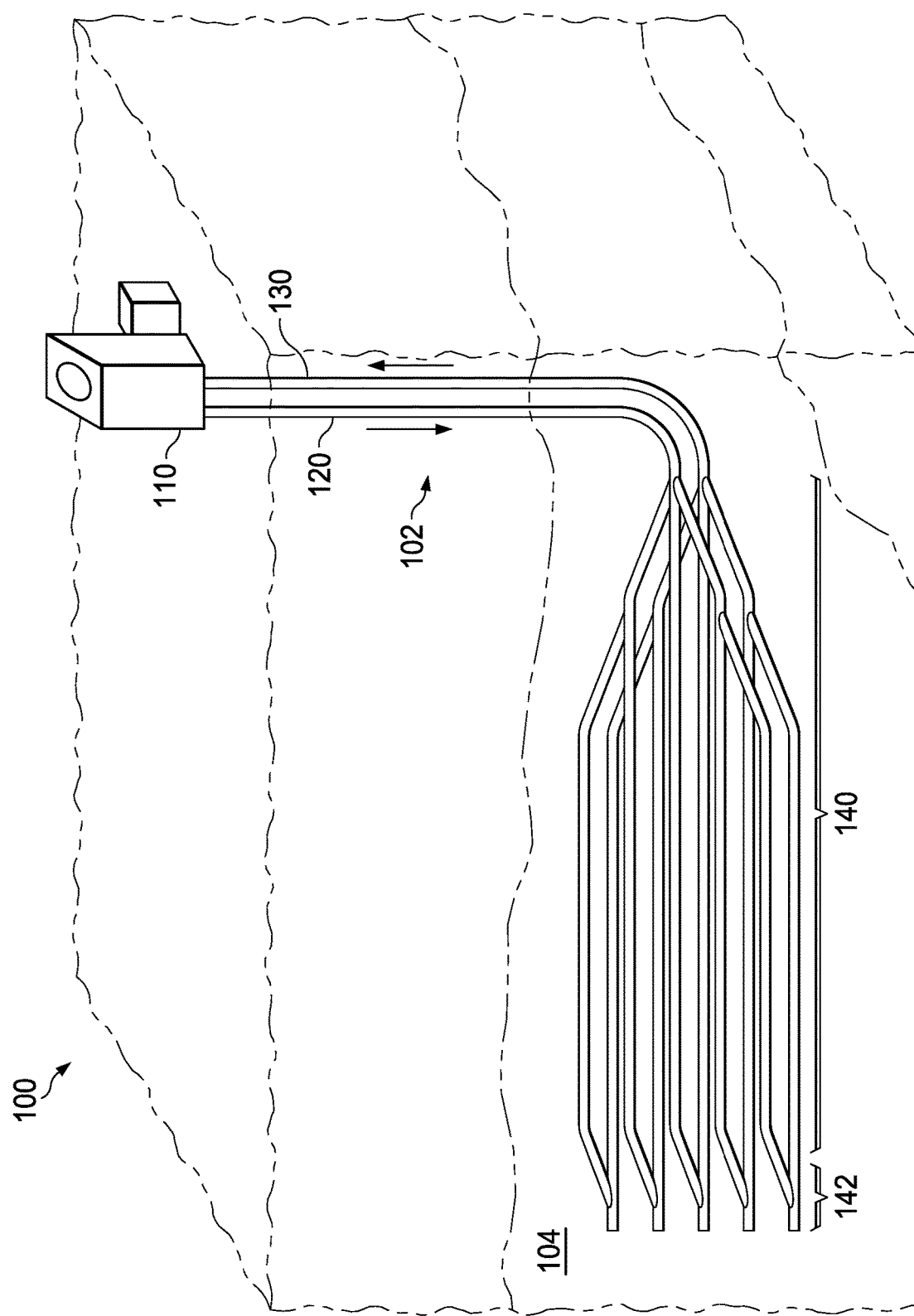
FIG. 1 is schematic illustration of a closed-loop geothermal system in accordance with the concepts herein.

FIG. 1 shows a closed-loop geothermal system in accordance with the concepts herein. In certain instances, the closed-loop geothermal wellbore system can be, for example, a system such as that developed by Eavor Technologies Inc. of Calgary, Alberta, which includes a network of sealed lateral wellbores which exchange heat with the subterranean zone.

Referring to FIG. 1, system 100 includes a closed loop system having a well 102 drilled within a subterranean zone 104. In the illustrated instance, well 102 includes an inlet surface wellbore 120 and an outlet surface wellbore 130 in close proximity, each extending between the terranean surface and the subterranean zone 104 and connected within the subterranean zone 104 by one or more lateral wellbores 140. In the illustrated instance, lateral wellbores 140 include a plurality of pairs of multilateral wellbores which intersect at toes 142: i.e., which split from inlet surface wellbore 120, extend a distance into subterranean zone 104 and return from toes 142 towards (and combining back into) outlet surface wellbore 130, in a closed loop. In other instances, the inlet surface wellbore and the outlet surface wellbore can be separated by a longer distance, with the lateral wellbores connecting them in the subsurface, forming a U-shape configuration.

In the illustrated instance, inlet surface wellbore 120 and outlet surface wellbore 130 are vertical wellbores, drilled substantially straight (i.e., without the use of directional drilling methods or equipment). The lateral wellbores 140 are drilled substantially horizontal, for example, by using directional drilling methods and equipment, and include a curve in their trajectory beginning at a kickoff from vertical. In other instances, the inlet and/or outlet surface wellbores are other than vertical and/or may be drilled with the use of directional drilling. In some instances, some or all of the lateral wellbores are other than horizontal. In some (not all) instances, the lateral wellbores 140 are drilled so as to follow the geological dip of the formation in the subterranean zone. In some instances, lateral wellbores 140 can be anywhere from 2000 meters to 8000 meters or more in length and from 1000 meters to 8000 meters in depth from the surface.

In some instances, a majority of the lengths of inlet surface wellbore 120 and outlet surface wellbore 130 are cased, and lateral wellbores 140 are open hole. In some instances, the entire length of lateral wellbores 140 can be open hole: in other instances, lateral wellbores can be open hole at the junctions where lateral wellbores 140 meet inlet surface wellbore 120 and outlet surface wellbore 130 (and/or at the toes 142) and lined for at least a portion of the distance between those junctions and/or toes (for example, lined in those portions where the subterranean zone is susceptible to collapse due to faulting and/or unconsolidated geological materials, but otherwise open hole). As described in further detail with respect to FIG. 2, in some instances, some or all of the lengths of lateral wellbores 140 can be substantially sealed without the use of casing by forming an interface between the lateral wellbore and the subterranean zone substantially impermeable to fluids.

In the illustrated instance, system 100 further includes a facility 110 disposed between inlet surface wellbore 120 and outlet surface wellbore 130. Well 102 can be sealed and a working fluid added to the closed loop and circulated in the system such that it absorbs heat from subterranean zone 104. In certain instances, facility 110 includes a heat exchanger for extracting the heat from the working fluid and conveying it into a related process, such as a Rankine cycle (e.g., Organic Rankine Cycle) or other heat cycle that generates electricity, a steam generation process for industrial, agricultural or residential use, or another process. In certain instances, instead or in addition to a heat exchanger, facility 110 directly uses the heated working fluid, such as by passing it through an expander (e.g., a turbine) that drives a electric generator or directly using the heat of the working fluid in an industrial, agricultural or residential process. In some instances, facility 110 is disposed at or near the Earth's surface: in other instances, facility 110 may be disposed partially or fully within a subsurface location.

In some instances, the working fluid can be a fluid with a non-linear temperature enthalpy relationship to maximize the temperature differential and heat transfer between the fluid and subterranean zone 104. In some instances, the working fluid can be an aqueous electrolyte solution as described in U.S. Pat. App. Pub. No. 20190346181. In some instances, working fluid can be water-based. In some instances, working fluid can have a high heat capacity (i.e., greater than 3.0 KJ/kg-K and/or a high coefficient of thermal expansion (i.e., greater than $10^{-4}$ $K^{-1}$)). In addition to its heat transfer properties, the working fluid can be environmentally benign, non-toxic, stable at high temperatures and pressures, capable of flow, and able to provide compressive strength to the subsurface formation.

In the closed loop system of FIG. 1, the working fluid circulates within the system and is isolated from subsurface or surface fluids (by sealant, but in certain instances, the isolation can be created alternatively or additionally by piping, casing, and/or other methods), with no or substantially no loss of working fluid into the environment and no or substantially no flow of natural fluid from the environment (for example, surface water or groundwater) into the system. Periodic adjustment and maintenance of a closed loop system may require that working fluid be added to or removed from the system or otherwise adjusted (for example, with respect to volume, pressure, and/or composition), with the system otherwise remaining closed.

Figure 2:
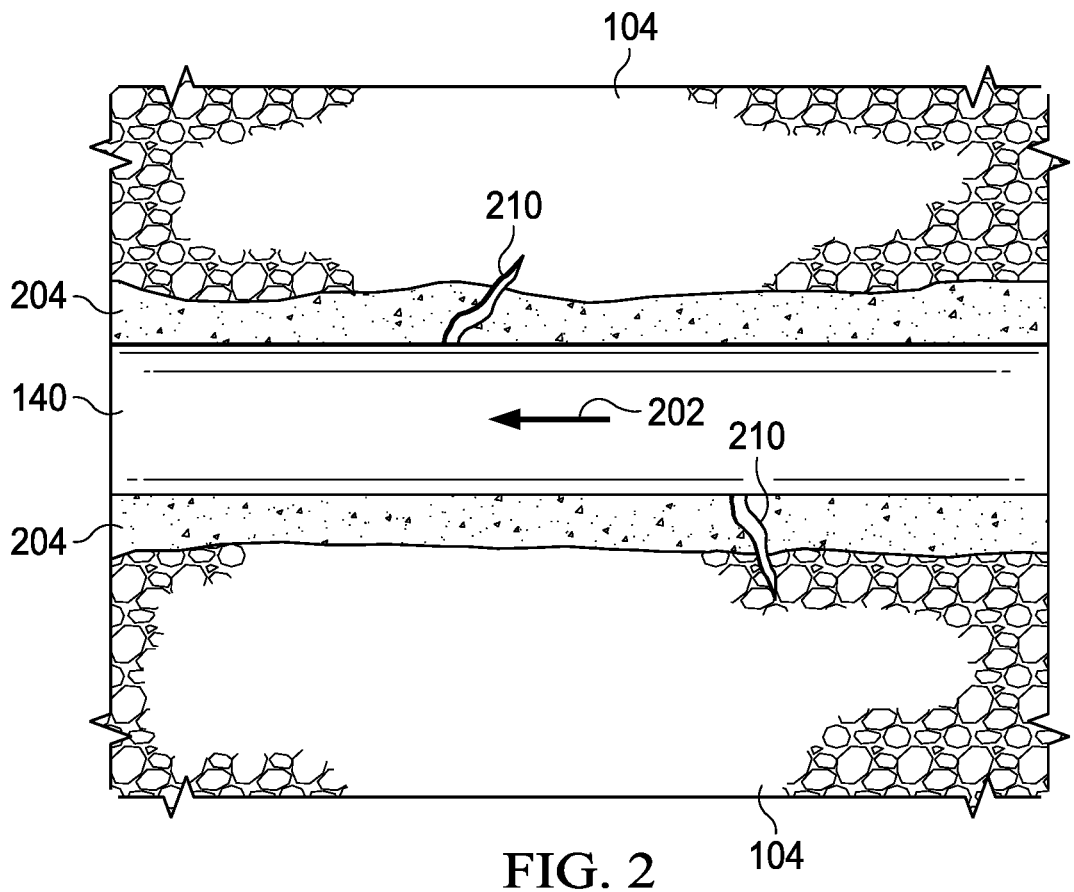
FIG. 2 is a schematic illustration of a portion of a lateral wellbore in accordance with the concepts herein.

FIG. 2 is a schematic illustration of a portion of a lateral wellbore 140 in accordance with the concepts herein. Referring to FIG. 2, lateral wellbore 140 is formed through subterranean zone 104 as described above in reference to FIG. 1. In the illustrated instance, lateral wellbore 140 is sealed with a sealant 204 embedded in the subterranean zone. Such sealing may be done by various methods. For example, in some instances, an drilling fluid can be used during drilling operations that precipitates into a solid upon contact with rock, creating a substantially impermeable seal. In some instances, in addition to or instead of depositing sealant material, the drilling fluid may cause damage to the rock surrounding the wellbore, decreasing the rock's permeability. Some such methods are described in U.S. Pat. App. Pub. No. US20200011151A1. In some instances, slugs of fluids with sealant can be added to the drilling fluid while drilling. In some instances, lateral wellbore 140 is sealed by treating the well after drilling, instead of or in addition to sealing during drilling operations. In some instances, all or a portion of lateral wellbore 140 is cased. In some instances where a portion (but not all) of lateral wellbore 140 is cased, some or all of the uncased portion lateral wellbore 140 is sealed with a sealant 204 embedded in the subterranean zone, as described above.

After drilling lateral wellbore 140, a working fluid 202 is introduced that flows through lateral wellbore 140 and circulates through the system as described above in reference to FIG. 1. Because the seal created by sealant 204 may not be completely impermeable, and/or because of fractures 210 or other cracks or holes in the embedded deposit of sealant 204, some working fluid 202 may leak from lateral wellbore 140 into subterranean zone 104 ("leakoff") and/or some formation fluid may leak from subterranean zone 104 into lateral wellbore 140. In a closed-loop system, such flow into or out of the subterranean zone may be undesirable, as it can (for example) result in the a lowering of volume and/or diluting of working fluid 202.

In some instances of the present disclosure, flow out of the system can be mitigated by increasing the viscosity of the working fluid, as such an increase in viscosity would have the effect of decreasing the flow of fluids through fractures or cracks (such as fractures 210) and/or through sealant 204 and/or subterranean zone 104, to the extent they are porous. Such increase in viscosity can be achieved by selecting a suitable working fluid exhibiting the desired viscosity and/or by adding a material to the working fluid to increase the viscosity. For example, in some instances, for a well 102 in a subterranean zone 104, a suitable viscosity of the working fluid would be about 10 centipoise (cP), assuming a mass flowrate of 60 kg/s and 12 laterals, each with an 8.5" diameter. Suitable additives to increase viscosity can in some instances include starch, partially hydrolized polyacrylamide (PHPA) polymers, or hydroxythyl cellulose (HEC).

In some instances of the present disclosure, the viscosity of working fluid can be increased by adding an additive to the working fluid which exhibits shear-thinning behavior. Shear thinning is a non-Newtonian behavior of fluids wherein viscosity increases under lesser shear strain and decreases under greater shear strain. An example of suitable shear-thinning additive in some instances of the present disclosure is xanthan gum with a concentration of about 0.6 kg of additive per m3 of working fluid. The shear strain forces acting on the working fluid can vary within different portions or segments of the closed loop system, depending on factors such as the geometry (such as size and shape) of the wellbores. For example, in an instance of the closed-loop system such as that illustrated in FIG. 1 wherein inlet surface wellbore 120 and outlet surface wellbore 130 are substantially vertical and lateral wellbores 140 are substantially horizontal, a shear-thinning fluid within well 102 would exhibit a lower average viscosity in inlet surface wellbore 120 and outlet surface wellbore 130 than in lateral wellbores 140, because of the higher flow velocity in the substantially vertical wellbores (assuming the same diameter and the same fluid temperature in the surface wellbores as in the lateral wellbores). Because higher viscosity of a working fluid can have the disadvantage of increasing hydraulic pressure loss in a power production system (and thus resulting in wasted energy), such shear-thinning behavior may be particularly advantageous in a system such as that shown in FIG. 1 that utilizes substantially vertical wellbores that may be (at least partially) cased and substantially horizontal wellbores that may be open-hole: relatively high viscosity in uncased sections (such as the lateral wellbores 140 in the example shown in FIG. 1) would minimize loss of working fluid from the uncased wellbores into the subterranean zone, but in at least partially cased sections where fluid loss is less of a concern (such as the substantially vertical surface wellbores 120 and 130 of FIG. 1), lower viscosity would minimize such hydraulic pressure loss in those sections.

Furthermore, laminar versus turbulent flow of the working fluid can be considered. At a Reynolds number above 3000, the thermal performance of the loop can be minimally impacted by viscosity: below a Reynolds number of 3000, viscosity can have a detrimental effect on system performance. Preferably, in some instances, a shear-thinning additive to working fluid 202 of FIG. 2 would be selected which would cause working fluid 202 to exhibit a viscosity in lateral wellbores sufficient to minimize loss to the subterranean zone while maintaining the Reynolds number in the lateral wellbores above 3,000.

Figure 3:
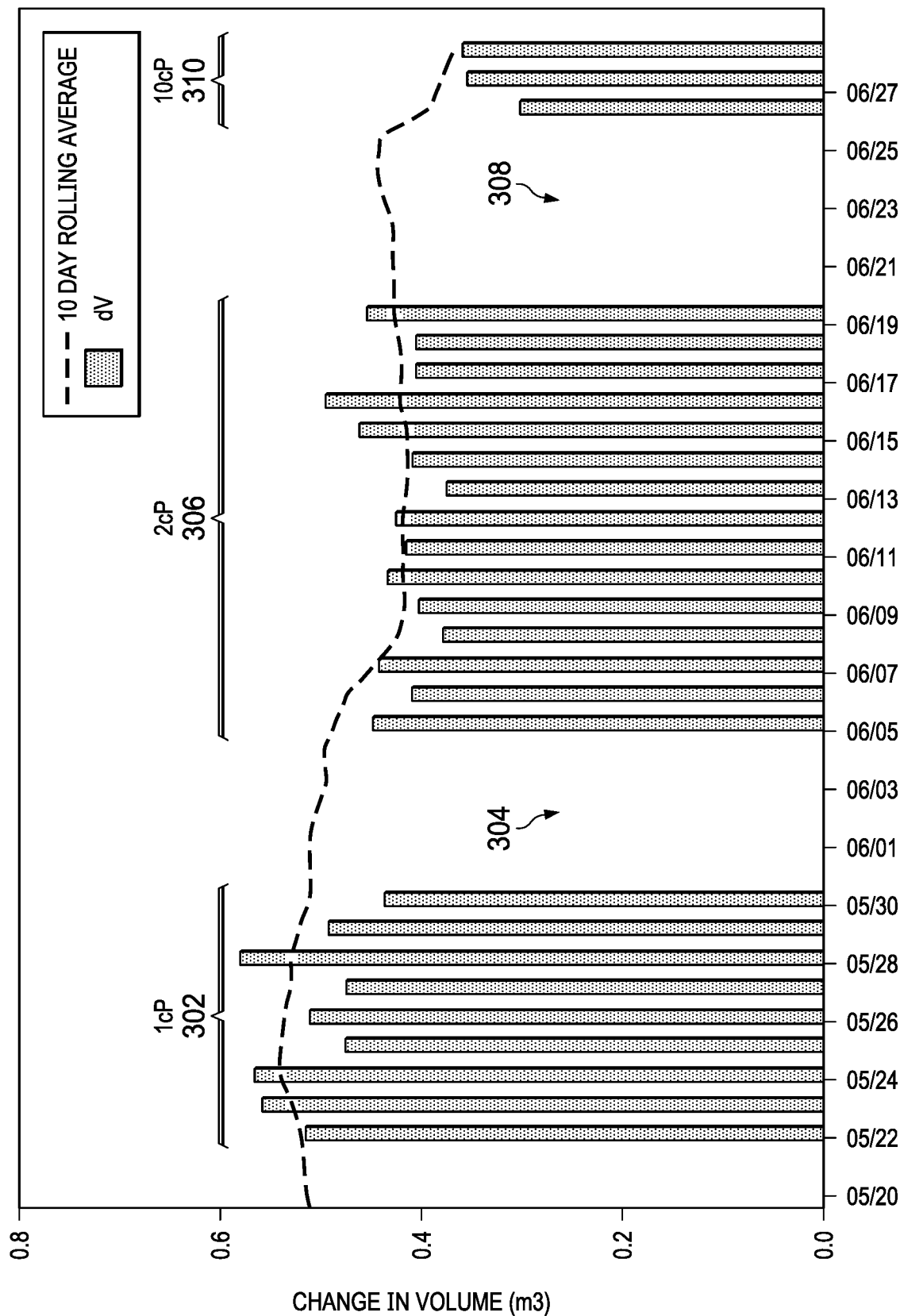
FIG. 3 is a graph of measured loss of fluid volume over time from a closed-loop system, before and after additions of a shear-thinning additive.

FIG. 3 is a graph of measured loss of fluid volume over time from a closed-loop system, before and after additions of a viscosity-increasing, shear-thinning additive. The measurements illustrated in FIG. 3 are from a closed-loop geothermal system with a substantially vertical inlet surface wellbore and substantially vertical outlet surface wellbore connected by a lateral wellbore in a subterranean zone, with the lateral wellbore being open-hole but substantially sealed against the flow of fluids into or out of the system by a seal layer embedded in the subterranean zone. As can be seen from the first group 302 of measurements, despite the seal in the subterranean zone, there is a change in volume (i.e., a loss) of working fluid from the system of between 0.5 and 0.6 cubic meters per day. This loss can be attributed at least in part to imperfect sealing and/or to the permeability of the sealant in the seal layer within the lateral wellbore. The average viscosity of the working fluid for first group 302 was about 1 cP. At point in time 304, a shear-thinning additive (xanthan gum) was added to the working fluid, increasing the average viscosity of the working fluid to about 2 cP. Second group 306 of measurements show a loss in volume from the system of between 0.4 and 0.5 cubic meters per day, i.e., less than the loss from the first group 302. At later point in time 308, additional xanthan gum was added to the working fluid to increase the average viscosity of the working fluid to about 10 cP. Third group 310 of measurements show a loss of less than 0.4 cubic meters per day, i.e., less than second group 306. Thus, addition of the viscosity-increasing, shear-thinning material was effective in reducing loss of working fluid from the system.

In some instances, instead or in addition to controlling the viscosity of the working fluid as described above, a flow of fluids into our out of a closed-loop system such as that described in reference to FIGS. 1 and 2 can be mitigated by controlling the pressure differential between the working fluid and the subterranean zone. As desired target pressure differential can be established at which the flow fluids into our out of the system is sufficiently reduced or mitigated. In some instances, for example, a target pressure differential between the working fluid and the subterranean zone is less than 100 kilopascals (kPa), with the working fluid pressure slightly higher than the pressure of the subterranean zone (formation pressure). In some instances, a target pressure differential between the working fluid and the subterranean zone is zero kPa. In other instances, another pressure differential can be targeted.

In some instances, the pressure differential between the working fluid and the subterranean zone can be controlled by controlling the density of the working fluid, thereby raising or lowering the hydrostatic head of the fluid in the well. Specifically, in situations where achieving the target pressure differential requires lowering the pressure of the working fluid, lowering the density of the working fluid can lower the weight of the fluid column in one or both of surface inlet and outlet wellbores of the system of FIG. 1, thereby reducing the pressure of the working fluid in the lateral wellbores. Similarly, in situations where achieving the target pressure differential requires increasing the pressure of the working fluid, increasing the density of the working fluid can increase the weight of the fluid column and increase the pressure of the working fluid in the lateral wellbores.

For example, in some instances, a density of the working fluid can be increased or decreased by decreasing or increasing (respectively) the temperature of the working fluid. For example, if the working fluid is water, the target density is 980 kg/m$^3$, and the reference inlet temperature is 20° C., the water temperature can be heated to 66° C. to achieve the target density.

The density of the working fluid can in some instances be lowered by emulsifying a gas within the working fluid that is of lower density than the working fluid. In one instance, for example, 98.8% by weight of a water-based working fluid with a density of 1,000 kg/m$^3$ can be combined with 1.2% by weight of an emulsified gas having a density of 100 kg/m$^3$ yielding a mixed density of 900 kg/m$^3$. In some instances, an additive can be added to the working fluid such that air or another gas can become entrapped in the fluid, thereby forming a foam or otherwise aerated mixture. Alternatively or in addition, low density particles such as microcells and/or other hollow or lightweight glass spheres can be added to the working fluid.

The density of the working fluid can in some instances be increased by adding barite or another high density material to the working fluid. In one instance, for example, 88.3% by weight of a water-based working fluid with a density of 1,000 kg/m$^3$ can be combined with 11.7% by weight of a barite solution having a density of 4,480 kg/m$^3$ yielding a mixed density of 1,100 kg/m$^3$.

The density of the working fluid can in some instances be controlled by flowing a second fluid in the system. In some instances, for example, the second fluid with a different density can be intermixed with the rest of the working fluid and thus changing the overall density of the mixture. Such fluid can be added at the surface and added along with the rest of the working fluid, or injected into the already-circulating working fluid. In other instances, instead of or in addition to such a mixture, a slug of fluid with a different density than the rest of the working fluid can be added to the system. For example, a light weight, low-density slug can be injected above the working fluid that is traveling downwards through the surface inlet wellbore, and/or above the working fluid that is traveling upwards through the surface outlet wellbore, thereby lowering the hydrostatic head of those respective wellbores. Such slugs could be injected via an injection site proximate the surface, or via a feedpipe or other suitable conveyance at another suitable location.

In some instances, the pressure differential between the working fluid and the subterranean zone can be controlled by controlling the pressure at which the working fluid is circulated. The pressure can be controlled by, for example, controlling the pressure at which the working fluid is injected into the inlet wellbore. In one instance, for example, if the target bottomhole pressure is 40,000 kPa, the reference case surface pressure is 200 kPa, and the reference case bottomhole pressure is 39,000 kPa, the surface pressure can be increased to 1,200 kPa in order to increase the bottomhole pressure to the target 40,000 kPa. Such an increase can be accomplished in various ways, including with a pump or by utilizing thermosiphon pressure.

In some instances, the pressure differential between the working fluid and the subterranean zone can be controlled by controlling the rate at which the working fluid is circulated. The circulation rate can be controlled by, for example, utilizing a flow control valve on surface such that hydraulic losses in the vertical section of the well reduce pressure sufficiently to maintain a target bottomhole pressure. In one instance, for example, if the target bottomhole pressure is 55,000 kPa and the reference case bottomhole pressure is 55,500 kPa, the flow can be increased such that hydraulic pressure drop in the vertical section increases by 500 kPa such that the target bottomhole pressure is achieved.

Figure 4:
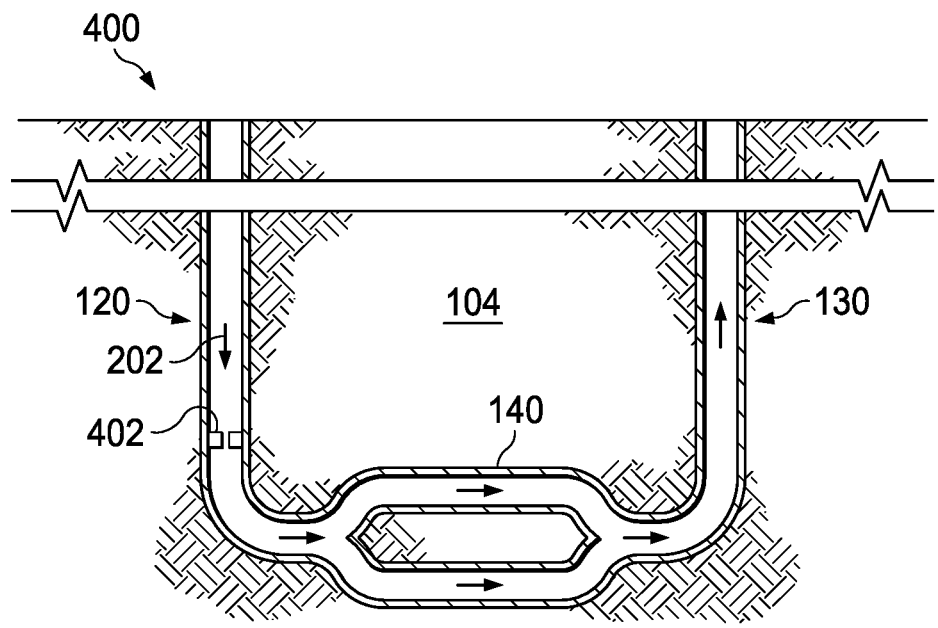
FIG. 4 is a schematic illustration of a closed-loop system with a subsurface flow restriction.

In some instances, in addition to or instead of the other methods described herein, a pressure differential between the working fluid and the subterranean zone can be controlled by adding a subsurface flow restriction to a wellbore of a closed-loop geothermal system. FIG. 4 is a schematic illustration of a closed-loop geothermal system in accordance with the concepts herein, with such a subsurface flow restriction. System 400 of FIG. 4 includes a closed-loop geothermal system with an inlet surface wellbore 120, an outlet surface wellbore 130, and lateral wellbores 140, through which working fluid 202 is circulated as described in reference FIGS. 1 and 2. System 400 further includes a flow restriction 402 positioned within inlet surface wellbore 120. Flow restriction 402 can include a reduced-diameter orifice, adjustable control valve, or other fixed or adjustable restriction that can reduce the pressure at which the working fluid is circulated from surface wellbore 120 into lateral wellbores 140, thereby controlling the pressure differential between the working fluid 202 and subterranean zone 104. The size, shape, and other characteristics of flow restriction 402 can be selected to produce a specified degree of fluid restriction or pressure drop to result in a desired pressure differential. A narrower restriction in the inlet wellbore can result in a greater pressure drop in the working fluid in the lateral wellbore downstream of the restriction than a wider restriction. For example, a bottomhole pressure reduction of 781 kPa can be achieved with a circular orifice plate with an orifice diameter of ½", a mass flowrate of 5 kg/s, a discharge coefficient of 1.0, and a working fluid density of 1,000 kg/m$^3$.

In some instances, in addition to or instead of flow restriction 402, the diameter of inlet surface wellbore 120, outlet surface wellbore 130, and or lateral wellbores 140 can be selected so as to control the differential pressure between the working fluid and the subterranean zone. For example, a vertical wellbore with a diameter of 216 mm, a length of 4.5 km, and a water circulation rate of 80 kg/s at 60° C. gives a bottomhole pressure of 43,400 kPa. If the target bottomhole pressure is 42,000 kPa, the diameter of the vertical wellbore can be reduced to 176 mm to achieve the target bottomhole pressure.

Figure 5:
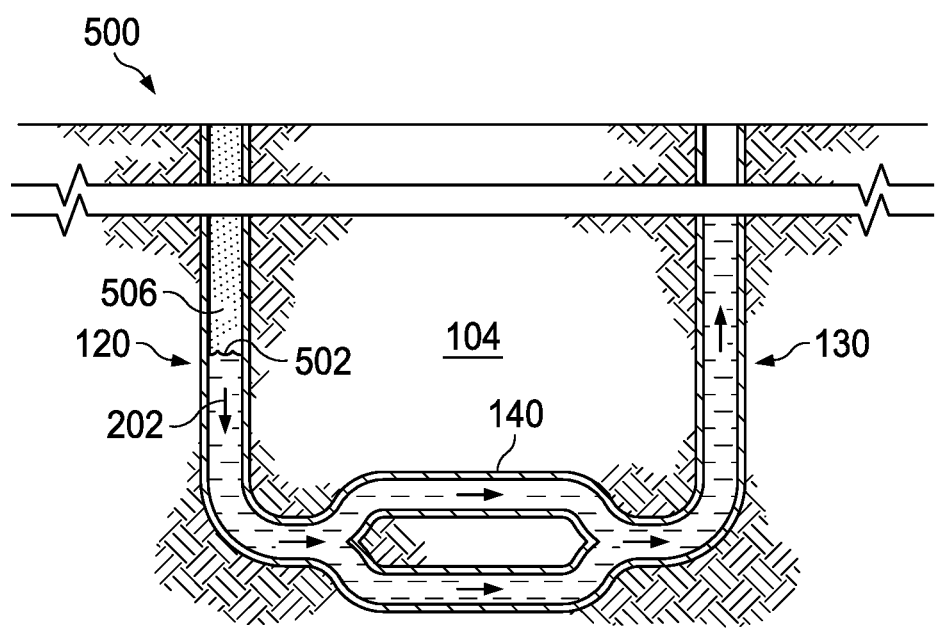
FIG. 5 is a schematic illustration of a closed-loop system with a targeted fluid level.

In some instances, in addition to or instead of the other methods described herein, the differential pressure between the working fluid and the subterranean zone can be controlled by adjusting a fluid level of the working fluid within the well in relation to a vapor space above the fluid level within in the wellbore proximate to the surface. FIG. 5 is a schematic illustration of a closed-loop geothermal system in accordance with the concepts herein, with such an adjusted fluid level. System 500 of FIG. 5 includes a closed-loop geothermal system with an inlet surface wellbore 120, an outlet surface wellbore 130, and lateral wellbores 140, through which working fluid 202 is circulated, as described in reference to FIGS. 1 and 2. Fluid level 502 within inlet surface wellbore 120 is adjusted (lowered) by the presence of vapor 504 which forms vapor space 506. In one instance, for example, reference case bottomhole pressure (with no vapour space) is 65,000 kPa, target bottomhole pressure is 62,000 kPa, working fluid density is 1,000 kg/m$^3$, and vapour density is 10 kg/m$^3$. In this instance, a vapour space of 305 m will achieve the target bottomhole pressure.

Figure 6:
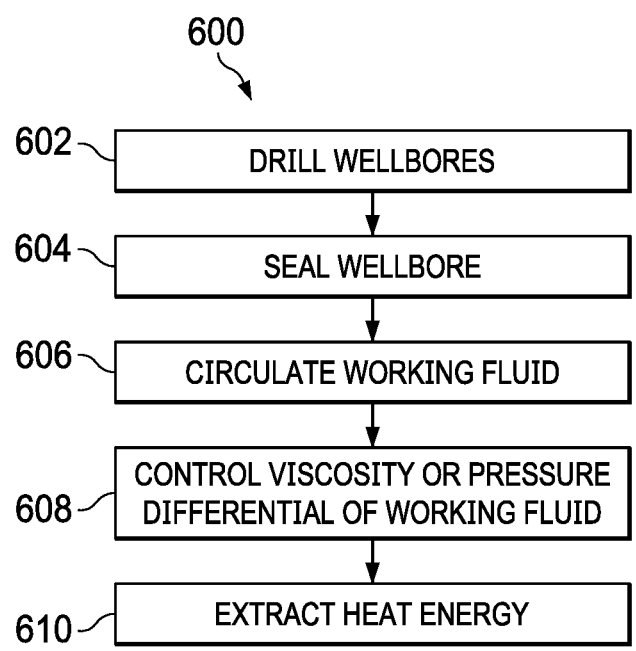
FIG. 6 is a process flow diagram of a method in accordance with the concepts herein.

FIG. 6 is a process flow diagram of a method in accordance with the concepts herein. The method begins at step 602, wherein a well is formed by drilling suitable wellbores in a subterranean zone. In the instance shown in FIG. 1, well 102 is formed by drilling inlet surface wellbore 120 and outlet surface wellbore 130 and connecting them by drilling one or more lateral wellbores 140, using conventional directional drilling technology. In some instances, the surface wellbores are cased but the lateral wellbores are left open-hole. Proceeding to step 604, the lateral wellbores are sealed to reduce or substantially eliminate the flow of fluids into or out of the wellbores. In some instances, the sealing can be accomplished by embedding a sealant in the subterranean zone (such as sealant 204 as described in reference to FIG. 2).

Proceeding to step 606, a working fluid (such as working fluid 202 described in reference to FIG. 2) is selected and circulated within the system. Because the sealant may not be completely impermeable, and/or because of fractures or other cracks or holes in sealant, some fluid may leak into or out of the system. Proceeding to step 608, while circulating the working fluid, at least one of a viscosity of the working fluid or a pressure differential between the working fluid and the subterranean zone are controlled using one or more of the techniques or methods as described above, thereby mitigating the flow of fluid between the subterranean zone and the well. At step 610, heat energy can be extracted from the system (for example, with a heat exchanger) and used for power generation or other applications.

While this disclosure contains many specific implementation details, these should not be construed as limitations on the subject matter or on what may be claimed, but rather as descriptions of features that may be specific to particular implementations. Certain features that are described in this disclosure in the context of separate implementations can also be implemented, in combination, or in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Nevertheless, it will be understood that various modifications, substitutions, and alterations may be made. While operations are depicted in the drawings or claims in a particular order, this should not be understood as requiring that such operations be performed in the particular order shown or in sequential order, or that all illustrated operations be performed (some operations may be considered optional), to achieve desirable results. Accordingly, the previously described example implementations do not define or constrain this disclosure. What is claimed is:

What is claimed is:

1. A method, comprising:

circulating a heat transfer working fluid in a closed loop between a geothermal well residing in a subterranean zone and at least one of a heat exchanger or a turbine, the well comprising one or more wellbores and substantially sealed to limit fluid loss of the working fluid into the subterranean zone, wherein at least one of the one or more wellbores comprises an open-hole length of wellbore;

in response to a flow of fluid between the open-hole length of wellbore and the subterranean zone while circulating the working fluid, selecting a target pressure differential between a pressure of the working fluid and a formation pressure of the subterranean zone, the target pressure differential selected to reduce the flow of fluid between the flow of fluid between the open-hole length of wellbore and the subterranean zone; and while circulating the working fluid, controlling a pressure differential between a pressure of the circulating working fluid and the formation pressure of the subterranean zone towards the target pressure differential.

2. The method of claim 1, wherein the one or more wellbores comprises a surface wellbore extending from the Earth's surface to the subterranean zone and the open-hole length of wellbore comprises a lateral wellbore extending from the surface wellbore in the subterranean zone, and wherein circulating the working fluid comprises circulating the working fluid in a closed loop between the heat exchanger, the surface wellbore and the lateral wellbore.

3. The method of claim 2, wherein at least a portion of the lateral wellbore is sealed with a sealant embedded in the subterranean zone.

4. The method of claim 2, wherein the surface wellbore is substantially vertical.

5. The method of claim 2, wherein at least a portion of a length of the surface wellbore is cased, and wherein a majority of a length of the lateral wellbore is open hole.

6. The method of claim 2, wherein at least a portion of a length of the lateral wellbore is cased.

7. The method of claim 1, wherein the working fluid is shear thinning.

8. The method of claim 2, wherein circulating the working fluid comprises circulating the working fluid under a higher average shear rate in the surface wellbore than in the lateral wellbore.

9. The method of claim 2, wherein a Reynolds number of fluid flow in the lateral wellbore is above 3,000.

10. The method of claim 1, wherein the controlling the pressure differential toward the target pressure differential is at least partially by emulsifying a gas within the working fluid.

11. The method of claim 1, wherein the controlling the pressure differential toward the target pressure differential is at least partially by adding low density particles to the working fluid.

12. The method of claim 1, wherein the controlling the pressure differential toward the target pressure differential is at least partially by adding a material to the working fluid having a higher density than the working fluid.

13. The method of claim 1, wherein the controlling the pressure differential toward the target pressure differential is at least partially by flowing, with the working fluid, a second fluid having a different density than the working fluid.

14. The method of claim 1, wherein the controlling the pressure differential toward the target pressure differential is at least partially by controlling a temperature of the working fluid.

15. The method of claim 1, wherein the controlling the pressure differential toward the target pressure differential is at least partially by controlling a pressure at which the working fluid is circulated.

16. The method of claim 1, wherein the controlling the pressure differential toward the target pressure differential is at least partially by using a fluid flow restriction having specified flow characteristics in the well.

17. The method of claim 1, wherein the controlling the pressure differential toward the target pressure differential is at least partially by adjusting a fluid level of the working fluid within the well in relation to a vapor space above the fluid level within in the well proximate to the surface.

18. The method of claim 1, wherein the controlling the pressure differential towards the target pressure differential is at least partially by controlling a circulation rate of the working fluid.

19. The method of claim 2, wherein the controlling the pressure differential towards a the target pressure differential is at least partially by selecting a specified diameter of the surface wellbore or the lateral wellbore.

20. A method comprising:
circulating a working fluid in a closed loop between a geothermal well residing in the subterranean zone and at least one of a heat exchanger or a turbine, wherein the geothermal well comprises one or more wellbores and wherein at least one of the one or more wellbores comprises an open-hole length of wellbore;
in response to a loss of the working fluid from the open-hole length of wellbore into the subterranean zone occurring while the working fluid is circulated in the closed loop, selecting a target concentration of a shear-thinning material in the working fluid to exhibit an increased viscosity to reduce the loss of the working fluid while maintaining a Reynolds number of the working fluid flowing in the open-hole length of wellbore above 3,000;
adding the shear-thinning material to the working fluid circulating in the well to reach the target concentration; and
extracting, with the heat exchanger and while the working fluid is circulating in the closed loop, heat from the working fluid.

21. The method of claim 20, wherein the shear-thinning material comprises xanthan gum.

22. The method of claim 1, wherein the target pressure differential is less than 100 kilopascals.

23. The method of claim 1, wherein the target pressure differential is zero kilopascals.

24. The method of claim 1, wherein the controlling the pressure differential towards the target pressure differential comprises circulating the working fluid at a pressure higher than the formation pressure.

* * * * *

UNITED STATES PATENT AND TRADEMARK OFFICE
CERTIFICATE OF CORRECTION

| | | |
|---|---|---|
| PATENT NO. | : 12,379,138 B2 | Page 1 of 1 |
| APPLICATION NO. | : 18/711333 | |
| DATED | : August 5, 2025 | |
| INVENTOR(S) | : Michael Holmes and Matthew Toews | |

It is certified that error appears in the above-identified patent and that said Letters Patent is hereby corrected as shown below:

In the Claims

In Column 12, Line 9, Claim 17, please replace "within in" with -- within --.

In Column 12, Line 16, Claim 19, please replace "towards a" with -- towards --.

Signed and Sealed this
Sixteenth Day of December, 2025

John A. Squires
*Director of the United States Patent and Trademark Office*